United States Patent [19]

McCabe

[11] 3,727,663

[45] Apr. 17, 1973

[54] DEVICE FOR MOUNTING FIRE DAMPER

[76] Inventor: Franics J. McCabe, Regency Woods H-16, Doylestown, Pa. 18901

[22] Filed: Jan. 25, 1971

[21] Appl. No.: 109,460

[52] U.S. Cl..................160/84 R, 160/1, 285/158, 285/424
[51] Int. Cl. ..............................................E06b 3/94
[58] Field of Search................................160/1, 84 R; 126/285, 314; 285/158, 202, 222, 424; 287/36 D

[56] References Cited

UNITED STATES PATENTS

| | | | |
|---|---|---|---|
| 1,441,967 | 1/1923 | Cowell | 285/424 |
| 1,701,987 | 2/1929 | Sawyer | 49/171 |
| 2,198,535 | 4/1940 | James | 126/314 |
| 1,935,690 | 11/1933 | Zack | 285/424 |
| 3,495,606 | 2/1970 | Phillips | 160/84 R |

Primary Examiner—Peter M. Caun
Attorney—Frank J. Benasutti

[57] ABSTRACT

An adapter means is provided for mounting a fire damper in a wall, for positioning the fire damper in its mounted condition, and for connecting it to duct work. The device comprises one or more sheet metal members coextensive with a portion of the fire damper which has been bent to engage the wall and the duct work.

5 Claims, 5 Drawing Figures

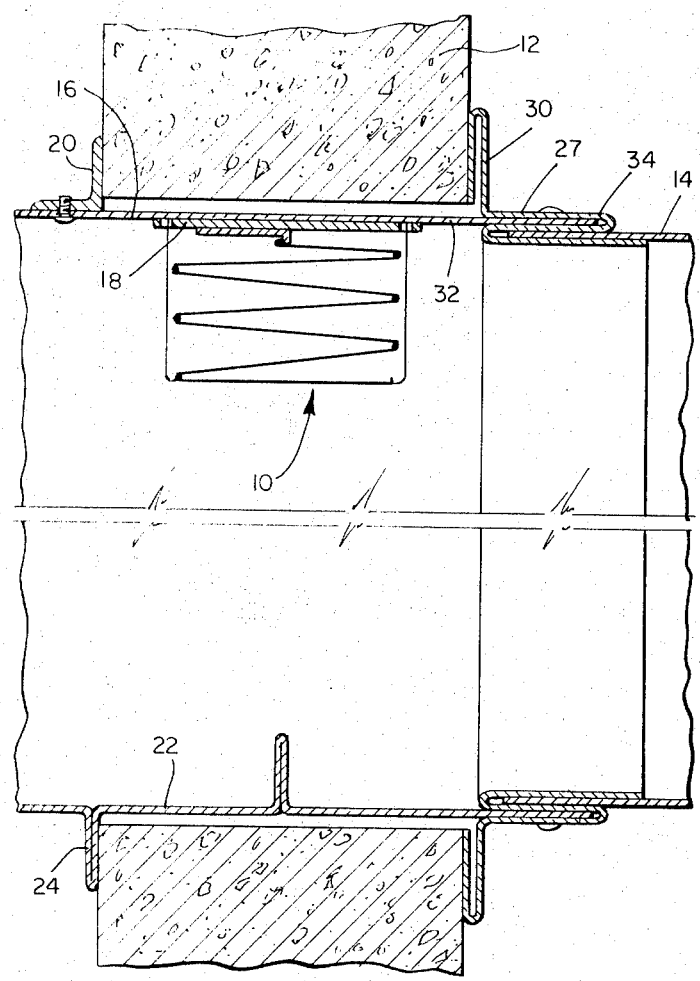
Fig. 1a
Fig. 1b
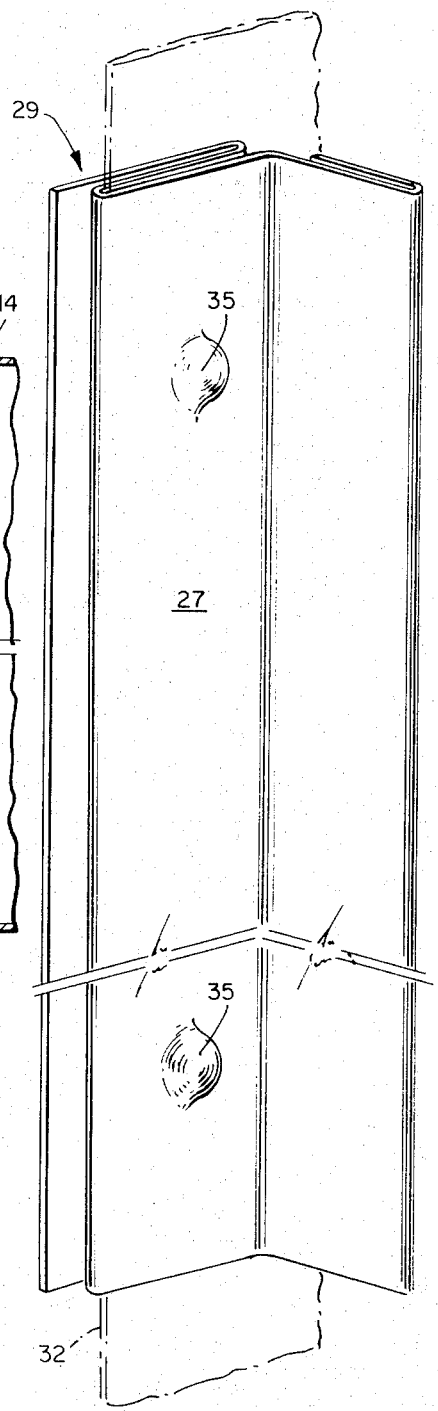
Fig. 2
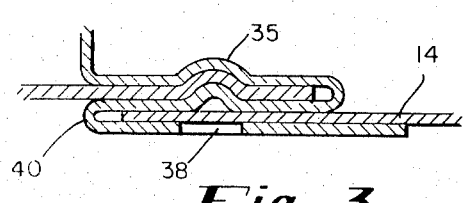
Fig. 3
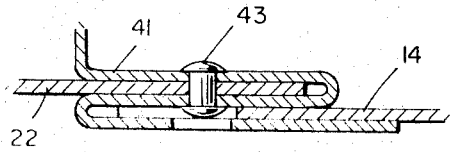
Fig. 4

DEVICE FOR MOUNTING FIRE DAMPER

BACKGROUND OF THE INVENTION

This invention relates to fire dampers, and more particularly, to a means for mounting and positioning a fire damper in a wall and connecting it to the duct work in a building.

Fire dampers, as shown for example in my U.S. Pat. Nos. 3,273,632 and 3,401,734, are commonly mounted in inner walls and partitions and the like in buildings and are connected to the air duct work. In the prior art, the ordinary means for accomplishing this mounting and positioning was to place a sleeve about the fire damper, bolt the sleeve to the fire damper frame, position a separate piece of angle iron against the wall, and then bolt the sleeve to the angle iron. It was then necessary to provide a separate adapter means to attach the sleeve to the air duct work. Such an angle iron 20 attached to a sleeve is shown in the upper left hand corner of FIG. 1a of the drawings of the present application.

I have observed that it is desirable to eliminate the separate sleeve and angle iron method of mounting and positioning the fire damper. It's further desirable to provide a means not only for positioning the fire damper, but also for attaching it to the duct work.

SUMMARY OF THE INVENTION

The present invention comprises a unitary element for use in combination with a fire damper to mount and position the damper in the wall and to connect it to existing duct work.

In the embodiments described hereinbelow a sheet metal sleeve is provided for connection to a frame of a fire damper, said sleeve having a preformed flange for engaging the wall. This sleeve serves to both mount and position the damper in the wall.

There is also disclosed a sheet metal member which is bent in a number of planes to provide a means for positioning the sleeve with respect to the wall and further for attaching the sleeve and damper combination to the duct work.

Accordingly, it is an object of this invention to provide a means which eliminates costly parts and labor in installation of a fire damper and which, at the same time, provides a means which is safe and effective for the purposes described above.

This and other objects of the invention will become apparent from the following description with reference to the accompanying drawings.

BRIEF DESCRIPTION OF THE DRAWINGS

FIGS. 1a and 1b are sections partially broken away of the devices in accordance with this invention as shown in their environment with a fire damper, a wall, and a portion of the duct work connected thereto;

FIG. 2 is a foreshortened perspective view of one of the devices in accordance with this invention shown in FIG. 1a in section;

FIG. 3 is a detail on an enlarged scale of the interrelationship of the parts shown in FIG. 1a, which has been shown in section; and FIG. 4 is another detail of the interrelationship of some of the parts shown in FIG. 1b, which has been enlarged and shown in section.

DESCRIPTION OF THE PREFERRED EMBODIMENTS

Although specific forms of the invention have been selected for illustration in the drawings, and the following description is drawn in specific terms for the purpose of describing these forms of the invention, this description is not intended to limit the scope of the invention which is defined in the appended claims.

I have shown in FIG. 1a a fire damper, designated generally 10, mounted in the wall 12 of the building in combination with the adjoining air duct work 14. In connection with the mounting of this fire damper, I have shown not only devices in accordance with the present invention, but also the methods of mounting and positioning the damper in accordance with the prior art. In particular, the upper sleeve 16 is the type of sheet metal sleeve known in the art which is rivetted or otherwise connected in any suitable manner to the frame 18 of the fire damper 10 prior to the time the fire damper 10 is inserted in the hole in the wall 12. This sleeve 16 is then bolted or otherwise suitably affixed to an angle iron 20 to position the fire damper. Four such angle irons are normally provided; at the top and bottom on each side. The devices in accordance with my invention eliminate the need for such an angle iron.

One such device is illustrated at the bottom of the fire damper in FIG. 1b and comprises a sheet metal sleeve 22 which is affixed to the frame of the damper or, as in the preferred embodiment shown, is an extension of the fire damper frame. This sleeve 22 extends outwardly from the main body portion of the fire damper and is bent at 90° in a reverse bend as at 24. It then continues along in the same plane as the first portion of the sleeve for connection to the duct work, as clearly illustrated. This reverse bend 24 and sleeve 22 provide for both mounting and positioning of the fire damper in the hole in the wall.

On the right hand side of the damper, I have illustrated adapters for use in positioning the fire damper and connecting it to the air duct work. The adapter 27 is shown in FIG. 1a at the top right hand corner and is illustrated in FIGS. 2 and 3. This adapter comprises a fabricated sheet metal part having three reverse bends, one of which is preferably at 90° to the other two. The upper reverse bend 30 functions as the flange for positioning the damper with respect to the wall. Whether the damper includes a sleeve, such as 22, which is part of the frame, or a sleeve, such as 16, which is bolted to the frame, the outer portion 32 of the sleeve of the damper extends out of the hole in the wall 12 and into the envelope of the reverse bend 34 of the adapter. The adapter is fixedly connected to the outer portion 32 of the sleeve after it is positioned thereon. This is accomplished by a dimpling operation (well known in the sheet metal trade) as shown in section in FIG. 3 and as illustrated by the raised portions 35 in FIG. 2, at intervals along the width of the adapter. Alternatively, the adapter can be rivetted as at 43, as shown by the adapter 41 in FIG. 4 and as illustrated in the lower right hand corner of FIG. 1b.

Both the rivetting and dimpling are accomplished by means of inserting a tool through a clearance hole, such as the clearance hole 38 FIG. 3, prior to the time the duct 14 is inserted into the envelope of the remaining reverse bend 40.

The reverse bend 40 is formed integrally with the adapter to provide a means for connecting the fire damper to the air duct work. The reverse bend 40 provides only sufficient clearance for insertion of the duct work 14 most preferably in a sliding fit. The bend 40 combined with the bend 34 forms an S-shape designated generally 29 FIG. 2.

From what has been described thus far it will be seen that I have provided in this invention means for replacing the existing complicated parts and installation methods for the type of device described.

I have provided simple structure for accomplishing the desirable end results of mounting and positioning a fire damper and connecting it to the air duct work of the building.

It will be understood that various changes in the details, materials and arrangements of parts which have been herein described and illustrated in order to explain the nature of this invention, may be made by those skilled in the art within the principle and scope of the invention as expressed in the following claims.

It will further be understood that the "Abstract of the Disclosure" set forth above is intended to provide a nonlegal technical statement of the contents of the disclosure in compliance with the Rules of Practice of the U.S. Pat. Office, and is not intended to limit the scope of the invention described and claimed herein.

What is claimed is:

1. A fire damper frame for mounting and positioning a multiple blade firedamper in its environmental condition in a wall, comprising: a sheet metal member in the form of an open ended rectangular conduit for insertion into a hole through a wall in a direction wherein its sides are embraced by the wall and its ends extend beyond the opening in the wall on both sides of the wall and provide a means for attaching sheet metal duct thereto; said sheet metal member having a flange extending outwardly about its periphery intermediate its ends substantially perpendicularly to the sides of the member a distance at least great enough to overlap the margins of said hole; and an adapter means for retaining and positioning said damper in said hole in said wall comprising: a combined integral retaining angle and slip joint means adapted to receive the open end of said sheet metal member on the opposite side of the wall from the flange in said frame for fixed engagement with said frame, and having an integrally formed outwardly extending flange for overlaping the margins of said hole and engaging the wall and positioning said damper therein.

2. The invention of claim 1 wherein said last mentioned flange comprises a reverse bend.

3. The invention of claim 1 wherein said adapter means comprises a plurality of reverse bends at least one of which is substantially normal to the others.

4. The invention of claim 1 in combination with an air duct wherein said adapter means comprises a plurality of reverse bends including at least one S-shaped bend providing a clearance for reception of the open end of said sheet metal frame in one portion thereof and clearance for reception of the duct in another portion thereof.

5. The invention of claim 4 wherein the portion receiving said duct has a clearance hole means therein for permitting tools to be inserted therethrough to engage the inner portion of the S-shaped bend.

* * * * *